US006085157A

United States Patent [19]

Takeda

[11] Patent Number: 6,085,157

[45] Date of Patent: *Jul. 4, 2000

[54] REPRODUCING VELOCITY CONVERTING APPARATUS WITH DIFFERENT SPEECH VELOCITY BETWEEN VOICED SOUND AND UNVOICED SOUND

[75] Inventor: Hiroaki Takeda, Kawasaki, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,326

[22] PCT Filed: Jan. 20, 1997

[86] PCT No.: PCT/JP97/00097

§ 371 Date: Sep. 12, 1997

§ 102(e) Date: Sep. 12, 1997

[87] PCT Pub. No.: WO97/26647

PCT Pub. Date: Jul. 24, 1997

[30] Foreign Application Priority Data

Jan. 19, 1996 [JP] Japan .................................... 8-007061

[51] Int. Cl.[7] ........................................................ G01L 3/02

[52] U.S. Cl. .......................... 704/208; 704/214; 704/267; 704/268

[58] Field of Search .................................... 704/208, 211, 704/258, 267, 270, 205, 206, 207, 200, 214, 266, 268

[56] References Cited

U.S. PATENT DOCUMENTS

| | | | |
|---|---|---|---|
| 3,723,667 | 3/1973 | Park, Jr. et al. | 369/50 |
| 4,468,804 | 8/1984 | Kates et al. | 704/265 |
| 4,841,382 | 6/1989 | Sasaki et al. | 360/32 |
| 5,089,820 | 2/1992 | Goral et al. | 341/139 |
| 5,130,864 | 7/1992 | Shimada | 360/60 |
| 5,175,769 | 12/1992 | Hejna, Jr. et al. | 704/211 |
| 5,511,237 | 4/1996 | Sakagushi | 455/79 |
| 5,611,018 | 3/1997 | Tanaka et al. | 704/215 |
| 5,630,013 | 5/1997 | Suzuki et al. | 704/216 |
| 5,633,983 | 5/1997 | Coker | 704/260 |
| 5,729,694 | 3/1998 | Holzrichter et al. | 704/270 |
| 5,742,688 | 4/1998 | Ogawa et al. | 381/17 |
| 5,781,885 | 7/1998 | Inoue et al. | 704/267 |
| 5,792,970 | 8/1998 | Mizobata | 84/607 |
| 5,828,995 | 10/1998 | Satyamurty et al. | 704/211 |

FOREIGN PATENT DOCUMENTS

| | | | |
|---|---|---|---|
| 59-82608 | 12/1984 | Japan | G11B 5/027 |
| 4-219797 | 8/1992 | Japan | G10L 3/02 |
| 5-257490 | 8/1993 | Japan | G10L 3/00 |
| 6-289895 | 10/1994 | Japan | G10L 3/02 |
| 7-210192 | 8/1995 | Japan | G10L 3/02 |

*Primary Examiner*—Richemond Dorvil

*Attorney, Agent, or Firm*—McDermott, Will & Emery

[57] ABSTRACT

The present invention can obtain a clear velocity converted sound in a sound signal which is recorded in recording media, without changing an interval of the sound signal. An input sound signal (1*a*) is transmitted from a sound signal storage memory (1) to a voiced sound/unvoiced sound deciding portion (2). In the voiced sound/unvoiced sound deciding portion (2), it is decided whether the input sound signal (1*a*) is a voiced sound or an unvoiced sound. A decision result is transmitted to a speech velocity converter (4) as a switching flag (1*b*). The speech velocity converter (4) outputs the unvoiced sound as it is. A predetermined windowing and adding processing is performed to the voiced sound, a time compression is carried out so as to output the voiced sound. An output signal (1*e*) from the speech velocity converter (4) is output as a frame output signal (1*g*) through an output sound signal frame buffer (8). In another mode, a switch and an adder may be used.

3 Claims, 11 Drawing Sheets

REPRODUCING VELOCITY CONVERTING APPARATUS WITH DIFFERENT SPEECH VELOCITY BETWEEN VOICED SOUND AND UNVOICED SOUND

TECHNICAL FIELD

The present invention relates to a reproducing velocity converting apparatus for a sound signal. More specifically, the present invention relates to the apparatus suitable for a desired-reproducing-velocity reproduction of the sound signal which is recorded in recording media.

BACKGROUND ART

Recently, a reproducing velocity converting technique for a sound signal has been put to practical use. In the technique, the sound signal is converted into a digital signal and the digital signal is recorded in recording media. The digital signal is then converted and output without changing an interval of the sound signal. A speech velocity converting system such as a TDHS (time domain harmonic scaling) system and a PICOLA (pointer interval control overlap and add) system is often used so as to achieve the technique.

The reproducing velocity converting apparatus which embodies the conventional speech velocity converting system will be described below with reference to the accompanying drawings.

FIG. 13 is a block diagram showing a construction of the conventional reproducing velocity converting apparatus.

As shown in FIG. 13, an input sound signal 1*a* is first transmitted from a sound signal storage memory 1 to a speech velocity converter 4. Next, a speech velocity converted sound signal 1*e* is calculated in the speech velocity converter 4. The speech velocity converted sound signal 1*e* is recorded in an output sound signal storage memory 6. The above processing is performed so as to obtain the velocity converted sound signal.

A speech velocity conversion in the above conventional reproducing velocity converting apparatus is accomplished by windowing a sound in accordance with pitch information as to the sound signal and by overlapping adjacent two data, each having a pitch period. An unvoiced sound part of the sound signal is performed in the same way as a voiced sound part. By the way, the sound signal is characterized by that the voiced sound part has a relatively steady waveform at the pitch period but the unvoiced sound part has the non-steady waveform. Thus, since the voiced sound part has the relatively steady waveform, the original waveform is difficult to deform even if the conventional speech velocity converting system is used. Disadvantageously, since the unvoiced sound part does not have the steady waveform, the original waveform is deformed after the speech velocity conversion.

DISCLOSURE OF THE INVENTION

It is an object of the present invention to provide a reproducing velocity converting apparatus which solves the above conventional problem and can change a sound signal velocity without deforming a waveform of an unvoiced sound part within a sound signal by switching a voiced sound part and an unvoiced sound part processing to each other whereby a clear velocity converted sound can be obtained.

In order to achieve the above object, the present invention is so constructed that a result of a voiced sound/unvoiced sound decision and a switch are used so as to control whether the original sound signal itself is output as it is or the speech velocity converted sound signal is output.

Thus, a speech velocity conversion can be carried out without changing an interval of the original sound signal and deforming the waveform of the unvoiced sound part. Accordingly, the clear velocity converted sound can be obtained.

Namely, according to one aspect of the present invention, there is provided a reproducing velocity converting apparatus which comprises data recording means for recording and holding a sound signal in the form of a digital signal; voiced sound/unvoiced sound deciding means for deciding whether the sound signal is a voiced sound or an unvoiced sound in an arbitrary section of the sound signal which is held in the data recording means; speech velocity converting means, a sound signal being read from the data recording means, the speech velocity converting means for outputting a sound as it is in a section which is decided to be an unvoiced sound part by the voiced sound/unvoiced sound deciding means, the speech velocity converting means for outputting, by changing a time length alone without changing an interval, the sound in the section which is decided to be a voiced sound part by the voiced sound/unvoiced sound deciding means; and data output means which can output a signal having a determined frame length of an output signal from the speech velocity converting means.

Accordingly, the reproducing velocity of the sound signal can be arbitrarily increased without changing the interval of the sound signal and deforming the waveform of the unvoiced sound part in the sound signal.

Furthermore, according to another aspect of the present invention, there is provided a reproducing velocity converting apparatus which comprises data recording means for recording and holding a sound signal in the form of a digital signal; voiced sound/unvoiced sound deciding means for deciding whether the sound signal is a voiced sound or an unvoiced sound in an arbitrary section of the sound signal which is held in the data recording means; speech velocity converting means, a sound signal being read from the data recording means, the speech velocity converting means for outputting a sound as it is in a section which is decided to be an unvoiced sound part by the voiced sound/unvoiced sound deciding means, the speech velocity converting means for outputting, by changing a time length alone without changing an interval, the sound in the section which is decided to be a voiced sound part by the voiced sound/unvoiced sound deciding means, wherein the speech velocity converting means has means for controlling a reading of the sound signal from the data recording means, the controlling means uses a decision result of the voiced sound/unvoiced sound deciding means so as to control a voiced sound part reading address in accordance with the time length of the unvoiced sound part so that an output signal may provide a value which approximates to a desired reproducing velocity; and data output means which can output a signal having a determined frame length of the output signal from the speech velocity converting means.

Accordingly, the reproducing velocity of the sound signal can be arbitrarily increased with substantial fidelity to a set compressibility by the use of a little memory without changing the interval of the sound signal and without deforming the waveform of the unvoiced sound part.

According to a further aspect of the present invention, there is provided a reproducing velocity converting apparatus which comprises data recording means for recording and holding a sound signal in the form of a digital signal; voiced sound/unvoiced sound deciding means for deciding whether the sound signal is a voiced sound or an unvoiced sound in an arbitrary section of the sound signal which is held in the data recording means; data switching means which can switch an output destination of the sound signal to be transmitted from the data recording means in accordance with the decision result from the voiced sound/unvoiced sound deciding means; speech velocity converting means which can change the time length alone of the sound signal to be transmitted from the data recording means without changing the interval of the sound signal; data adding means which can add the output signal from the speech velocity converting means to the output signal from data switching means; and output data recording means which can record the output signal from the data adding means, the processed sound signal.

Accordingly, the reproducing velocity of the sound signal can be arbitrarily increased without changing the interval of the sound signal and without deforming the waveform of the unvoiced sound part in the sound signal.

According to a still further aspect of the present invention, there is provided a reproducing velocity converting apparatus which comprises data recording means for recording and holding a sound signal in the form of a digital signal; voiced sound/unvoiced sound deciding means for deciding whether the sound signal is a voiced sound or an unvoiced sound in an arbitrary section of the sound signal which is held in the data recording means; speech velocity converting means which can change the time length alone of the sound signal to be transmitted from the data recording means without changing the interval of the sound signal; signal controlling means for receiving the output signals from the data recording means and speech velocity converting means and for outputting one of them in accordance with the decision result of the voiced sound/unvoiced sound deciding means; and data output means which can output a signal having a determined frame length of the output signal from the signal controlling means.

Accordingly, the reproducing velocity of the sound signal can be arbitrarily increased by the use of a little memory without changing the interval of the sound signal and without deforming the waveform of the unvoiced sound part in the sound signal.

BEST MODE FOR CARRYING OUT THE INVENTION

Embodiments of the present invention will be described below with reference to the accompanying drawings.

(1st Embodiment)

Figure 1:
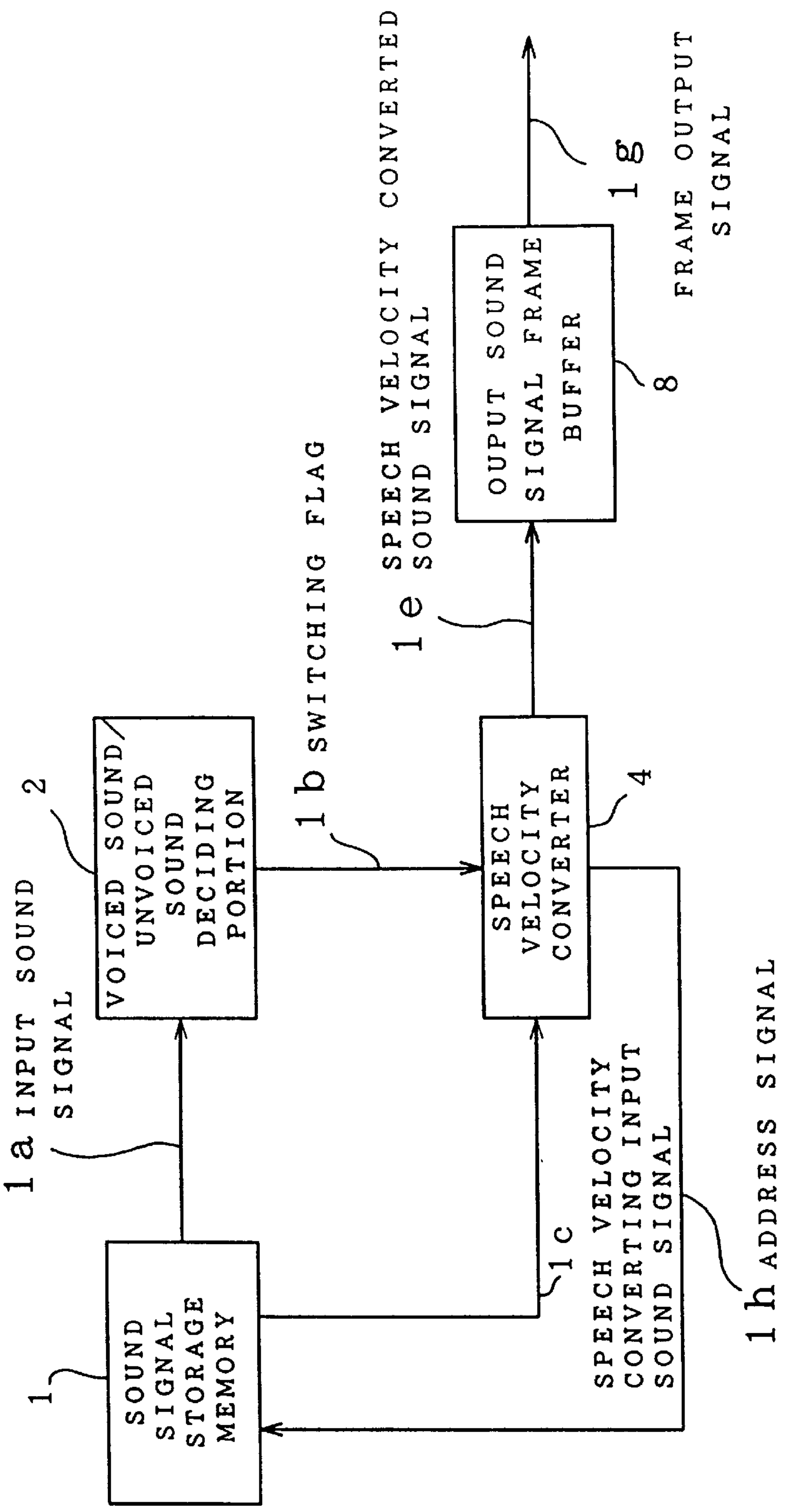
FIG. 1 is a block diagram showing a construction of a reproducing velocity converting apparatus according to a first embodiment of the present invention.
Figure 2:
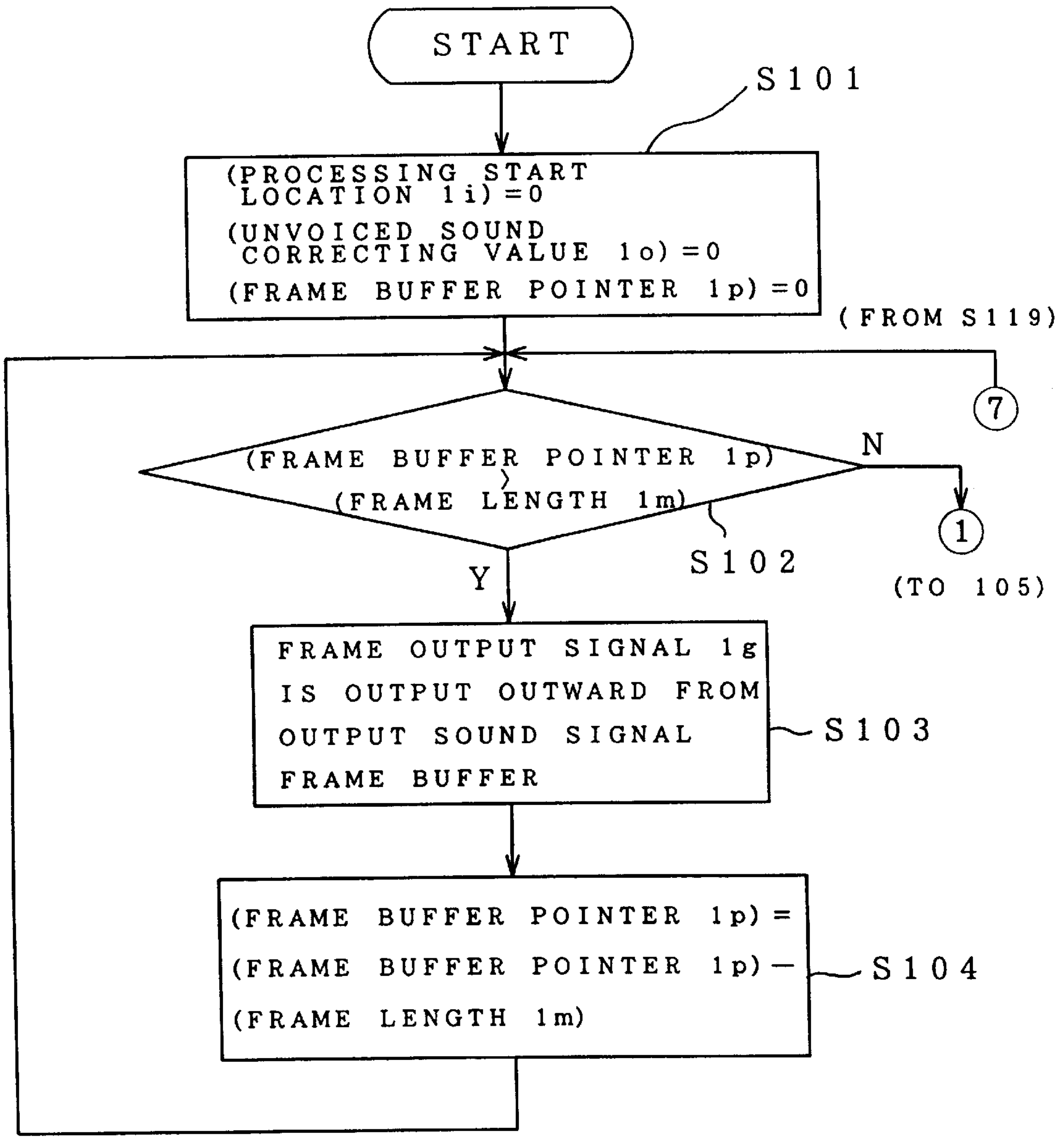
FIG. 2 is a partial flow chart showing a signal processing in the reproducing velocity converting apparatus according to the first embodiment of the present invention.
Figure 3:
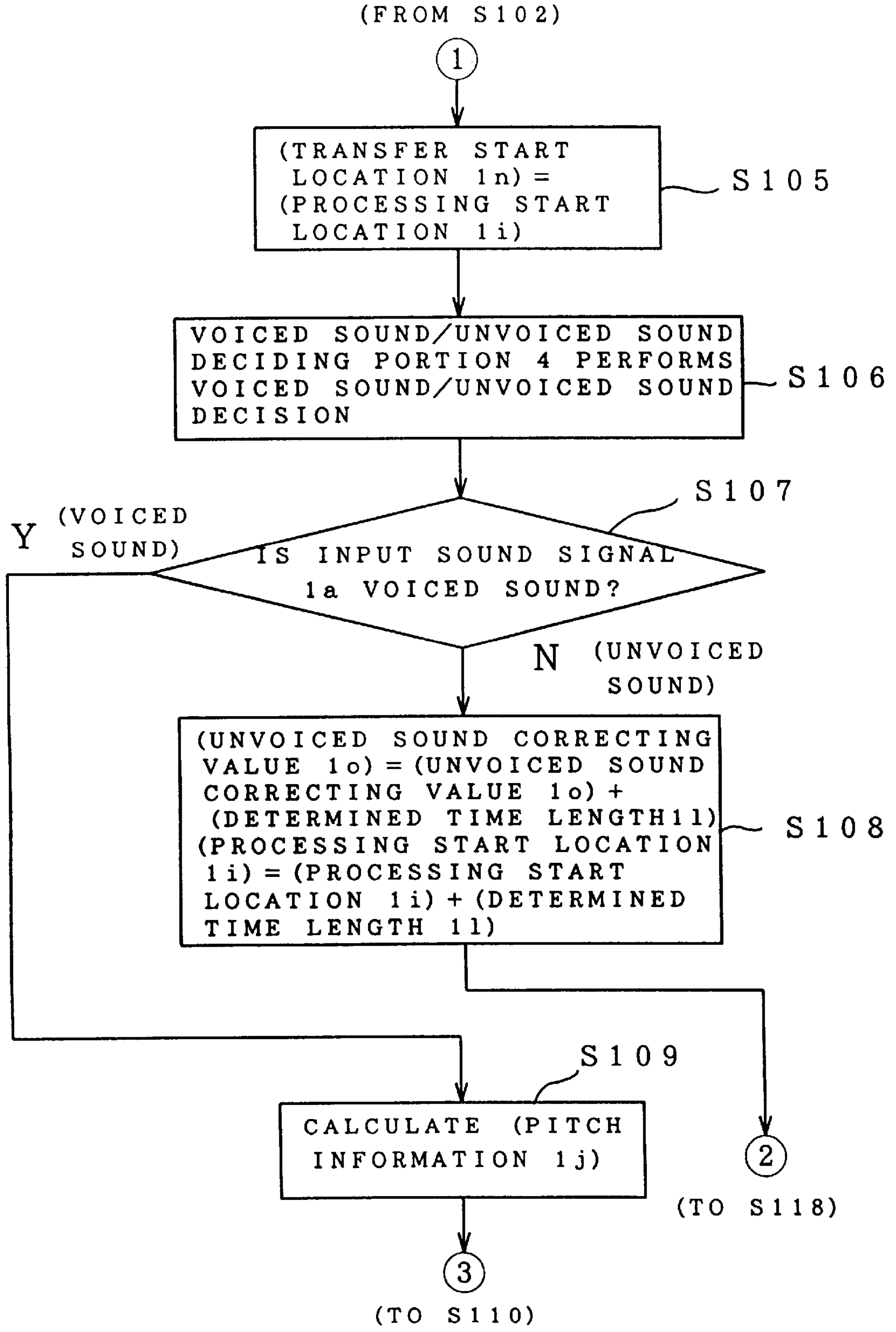
FIG. 3 is a partial flow chart showing the signal processing in the reproducing velocity converting apparatus according to the first embodiment of the present invention.
Figure 4:
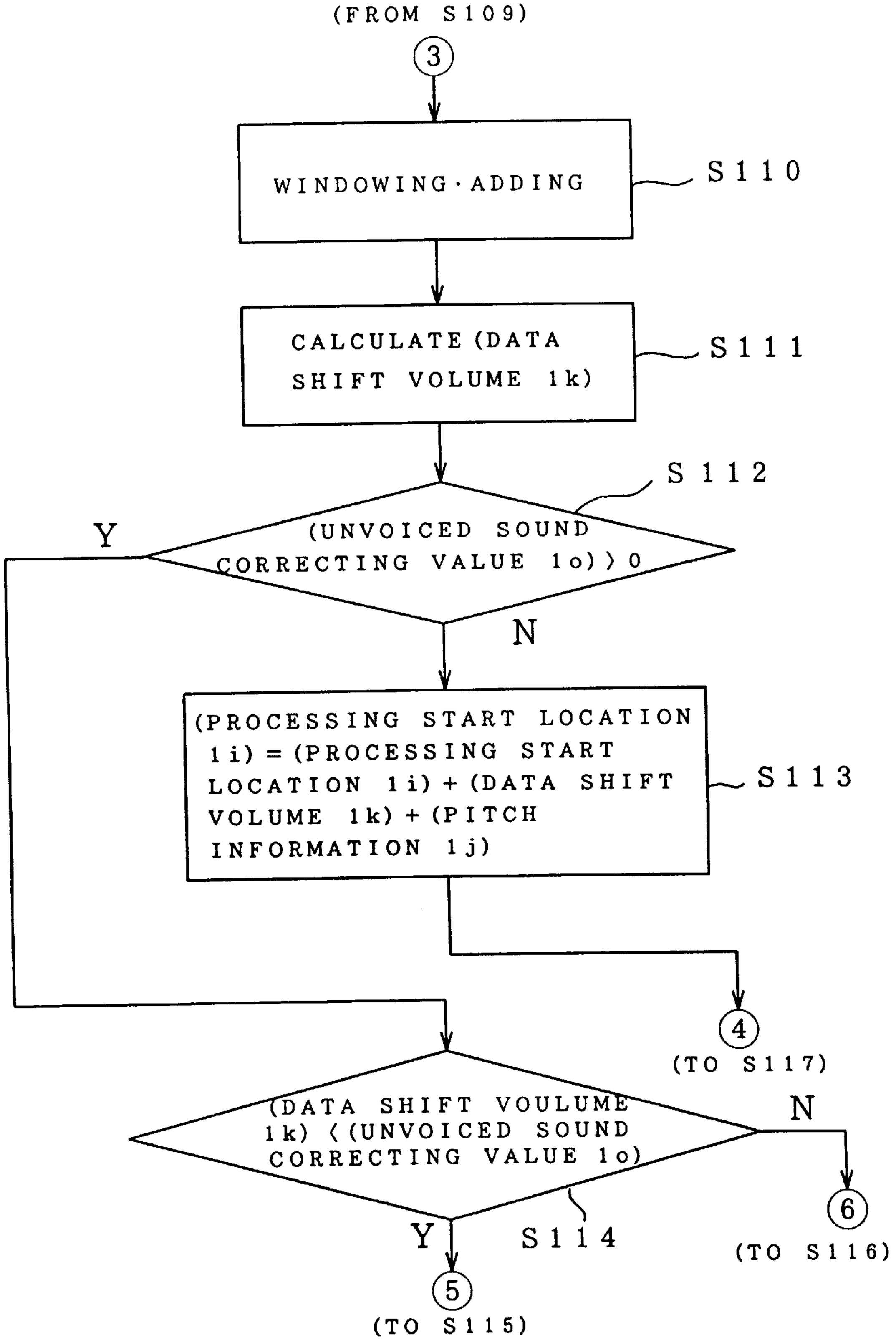
FIG. 4 is a partial flow chart showing the signal processing in the reproducing velocity converting apparatus according to the first embodiment of the present invention.
Figure 5:
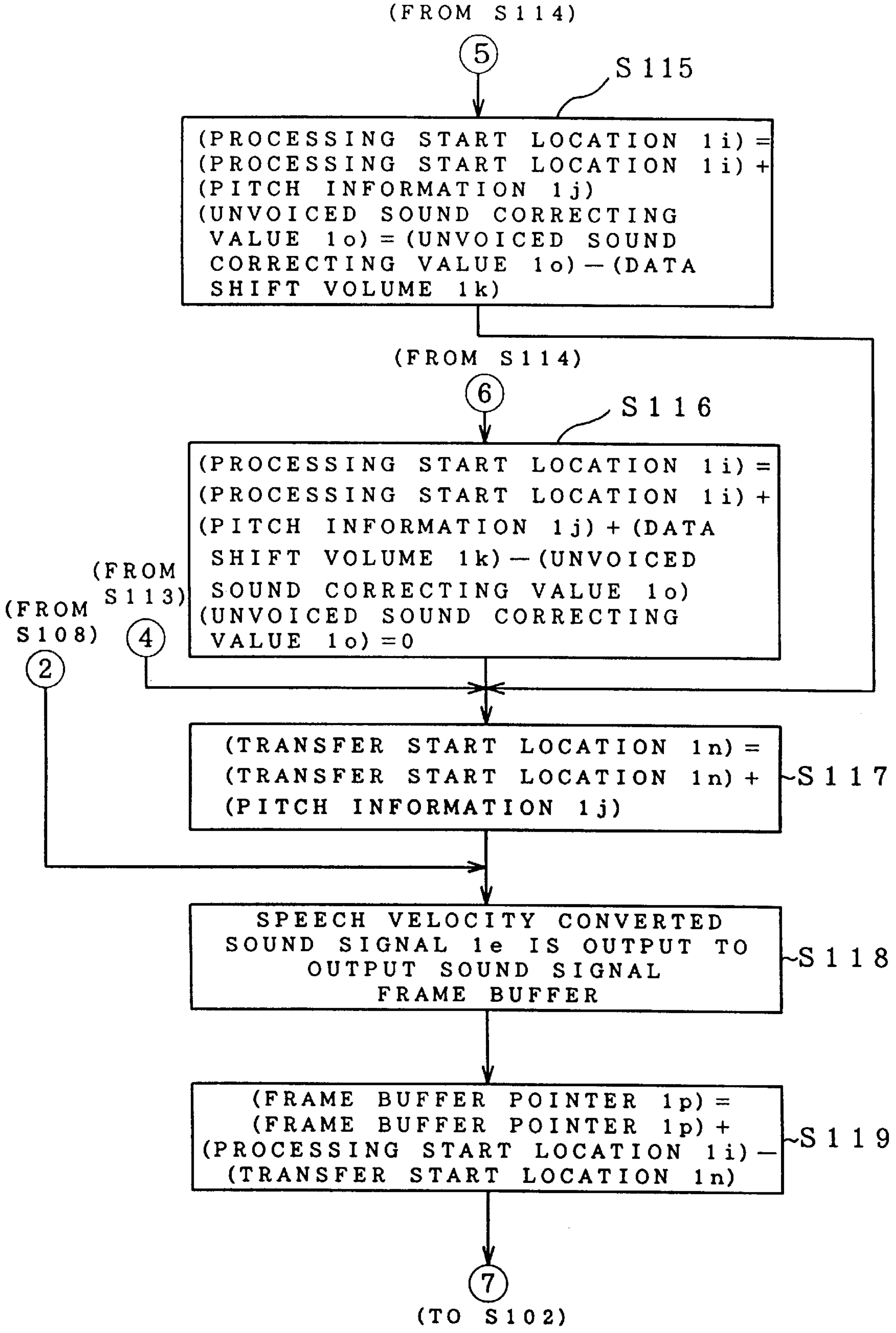
FIG. 5 is a partial flow chart showing the signal processing in the reproducing velocity converting apparatus according to the first embodiment of the present invention.

FIG. 1 is a block diagram showing a reproducing velocity converting apparatus according to a first embodiment of the present invention. Referring now to FIG. 1, a sound signal storage memory 1 is operated to be used as data recording means. A sound signal is recorded and held in the sound signal storage memory 1. For example, the sound signal is a digital signal which is read from recording media (not shown). The digital signal is recorded in the sound signal storage memory 1. An output signal from the sound signal storage memory 1 is provided for a voiced sound/unvoiced sound deciding portion 2 (voiced sound/unvoiced sound deciding means) which decides whether the sound signal is a voiced sound or an unvoiced sound in an arbitrary section. Furthermore, the output signal is provided for a speech velocity converter 4 (speech velocity converting means) which can change a time length alone without changing an interval of the sound signal and can indicate a processing address to the sound signal storage memory 1 in accordance with results of the speech velocity conversion and voiced sound/unvoiced sound decision. The output signal from the speech velocity converter 4 is provided for an output sound signal frame buffer 8 (data output means) which can output the signal having a frame length determined at a constant timing.

In addition, numeral 1*a* denotes an input sound signal which is supplied from the sound signal storage memory 1 to the voiced sound/unvoiced sound deciding portion 2. Numeral 1*b* denotes a switching flag which is supplied from the voiced sound/unvoiced sound deciding portion 2 to the speech velocity converter 4. Numeral 1*c* denotes a speech velocity converting input sound signal which is supplied from the sound signal storage memory 1 to the speech velocity converter 4. Numeral 1*e* denotes a speech velocity converted sound signal which is supplied from the speech velocity converter 4 to the output sound signal frame buffer 8. Numeral 1*g* denotes a frame output signal which is output from the output sound signal frame buffer 8. Numeral 1*h* denotes an address signal which is supplied from the speech velocity converter 4 to the sound signal storage memory 1.

In a construction shown in FIG. 1, each block other than the sound signal storage memory 1 can comprise a CPU (central processing unit) or a DSP (digital signal processor).

Figure 6:
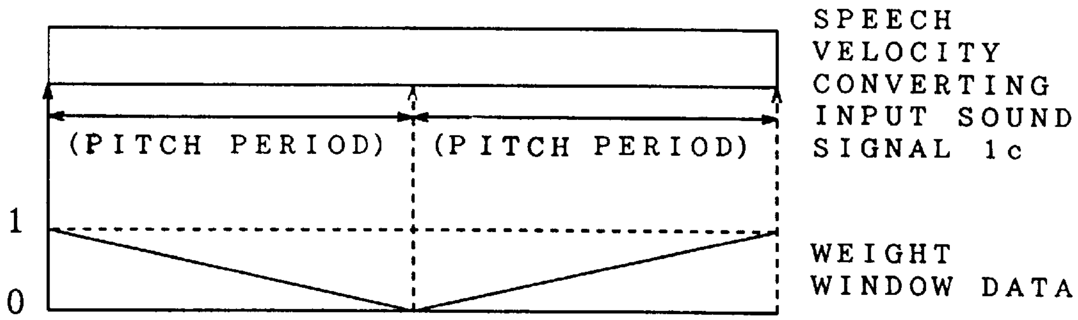
FIG. 6 shows a data windowing operation which is performed in a data operation part during a high-speed listening processing in the reproducing velocity converting apparatus according to the first embodiment of the present invention.
Figure 7:
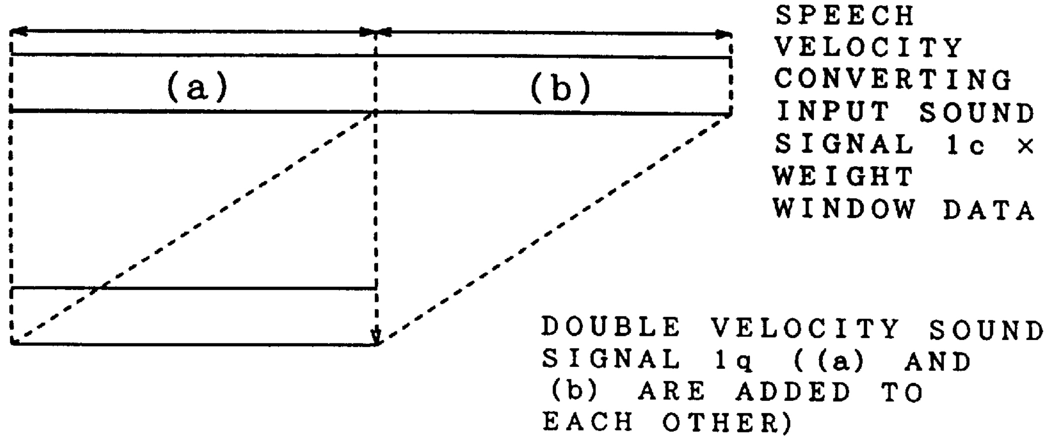
FIG. 7 shows a data overlapping operation which is performed in the data operation part during the high-speed listening processing in the reproducing velocity converting apparatus according to the first embodiment of the present invention.

Hereinafter, the above constructed reproducing velocity converting apparatus and the operation thereof will be described in detail with reference to flow charts shown in FIGS. 2 to 5, an illustration of a data windowing operation in a data operation part shown in FIG. 6 and the illustration of a data overlapping operation in the data operation part shown in FIG. 7.

In a step S101, an initial setting is first performed in the speech velocity converter 4. That is, each value of a (processing start location 1*i*), an (unvoiced sound correcting value 1*o*) and a (frame buffer pointer 1*p*) is set to zero, respectively. The (processing start location 1*i*) is a data transfer completion point in the address in the sound signal storage memory 1 as described below. The (processing start location 1*i*) also determines the address of a location at which the next processing is started. The (unvoiced sound correcting value 1*o*) indicates how long the unvoiced sound part exists. As described below, the (unvoiced sound correcting value 1*o*) is upgraded in accordance with the decided time length when the sound signal is decided to be the unvoiced sound. The (frame buffer pointer 1*p*) indicates the volume of data in the output sound signal frame buffer 8.

In a next step S102, it is determined whether or not the value of the (frame buffer pointer 1*p*) is larger than a (frame length 1*m*). If the value is larger, the processing proceeds to a step S103. Otherwise, the processing proceeds to a step S105. The (frame length 1*m*) is previously set to about 20 ms to 40 ms. In the step S103, the frame output signal 1*g* is output outward from the output sound signal frame buffer 8. In a next step S104, the value of (frame buffer pointer 1*p*)−(frame length 1*m*) is set to the (frame buffer pointer 1*p*). In the steps S102, S103 and S104, whenever the data in the frame buffer 8 becomes the frame length 1*m,* the data is output outward and the frame buffer pointer 1*p* is reset.

In the step S105, the value of (processing start location 1*i*) is set to a (transfer start location 1*n*). The (transfer start location 1*n*) determines the address of the transfer start location for the data within the speech velocity converting input sound signal 1*c* in the sound signal storage memory 1. In a next step S106, it is determined whether the input sound signal 1*a* transmitted from the sound signal storage memory 1 is a voiced sound or an unvoiced sound in the voiced sound/unvoiced sound deciding portion 4. The result of the decision is transmitted to the speech velocity converter 4 as the switching flag 1*b*. In this case, the time length of the input sound signal 1*a* to be determined in the voiced sound/unvoiced sound deciding portion 2 is defined as a (determined time length 1*l*). The time length can be set to the same extent as the above (frame length 1*m*), that is, about 20 ms to 40 ms.

In a next step S107, the processing is controlled by the switching flag 1*b* which is indicative of the decision result in the step S106. When the input sound signal 1*a* is a voiced sound, the processing proceeds to a step S109. When the input sound signal 1*a* is an unvoiced sound, the processing proceeds to a step S108. Namely, in case of the unvoiced sound, the windowing processing described below is not performed. The signal is outputted as it is, thereby resulting in preventing a waveform of the unvoiced sound from deforming and degrading. In the step S108, the value of (unvoiced sound correcting value 1*o*) is set to {(unvoiced sound correcting value 1*o*)+(determined time length 1*l*)}. The value of processing start location 1*i*) is set to {(processing start location 1*i*)+(determined time length 1*l*)}. The processing proceeds to a step S118. Since the switching flag 1*b* indicates that the sound signal is determined to be an unvoiced sound, the time length (determined time length 1*l*) of the input sound signal 1*a* for use in the decision can be generally treated as the unvoiced sound. Accordingly, such a processing is carried out.

In the step S109, a pitch period of the speech velocity converting input sound signal 1*c* to be transmitted from the sound signal storage memory 1 is calculated in the speech velocity converter 4. The calculated pitch period is defined as (pitch information 1*j*). In general, since a basic sound of a male voice has a frequency of 50 to 100 Hz, the (pitch information 1*j*) is set to 10 ms to 20 ms. In a next step S110, the speech velocity converting input sound signal 1*c* is multiplied by weighting window data as shown in FIG. 6. Furthermore, as shown in FIG. 7, the data in the adjacent pitch periods are added to each other, whereby a (double velocity sound signal 1*q*) which is indicative of the time length for the (pitch information 1*j*) is calculated. The (double velocity sound signal 1*q*) is overwritten so that the address {(processing start location 1*i*)+(pitch information 1*j*)} may be a head. In a next step S111, a (data shift volume 1*k*) is calculated. The (data shift volume 1*k*) can be calculated by the following equation:

(data shift volume 1*k*)={$R/(1-R)$})×(pitch information 1*j*), where ($R$:$0<R<1$).

Figure 8:
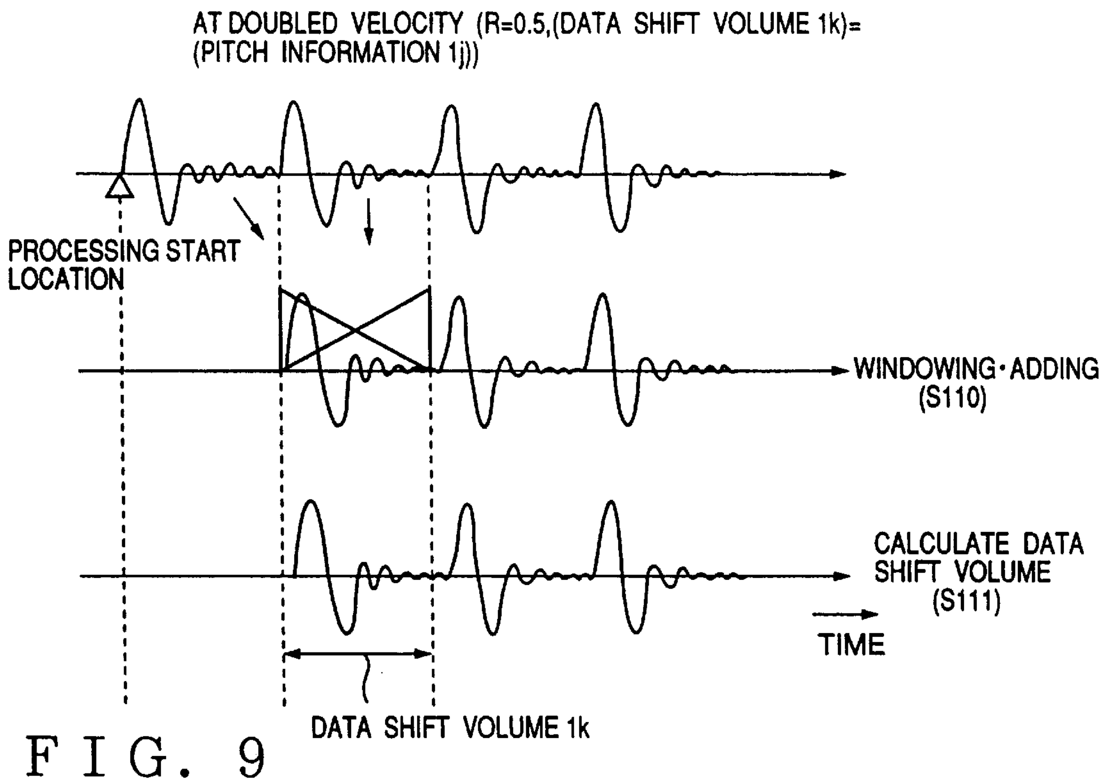
FIG. 8 is a waveform chart illustrating the processing which is performed in steps S110 and S111 shown in FIG. 4.

A reference R denotes a time length scaling factor in the speech velocity conversion. For example, in case of R=1/2, the speech velocity converter 4 is operated so that the speech velocity converting input sound signal 1*c* may have the 1/2-time time length (the speech velocity may be doubled). As understood from the above equation, in case of R=½, the (data shift volume 1*k*) is equal to the (pitch information 1*j*). FIG. 8 is a waveform chart exemplifying the processing which is performed in the steps S110 and S111.

In a next step S112, it is determined whether or not the (unvoiced sound correcting value 1*o*) is larger than zero. When the (unvoiced sound correcting value 1*o*) is larger than zero, the processing proceeds to a step S114. Otherwise, the processing proceeds to a step S113. In the step S113, the value of (processing start location 1*i*) is set to {(processing start location 1*i*)+(data shift volume 1*k*)+(pitch information 1*j*)}. The processing proceeds to a step S117. In the step S114, it is determined whether or not the value of (unvoiced sound correcting value 1*o*) is larger than the (data shift volume 1*k*). When the value is larger, the processing proceeds to a step S115. Otherwise, the processing proceeds to a step S116.

Figure 9:
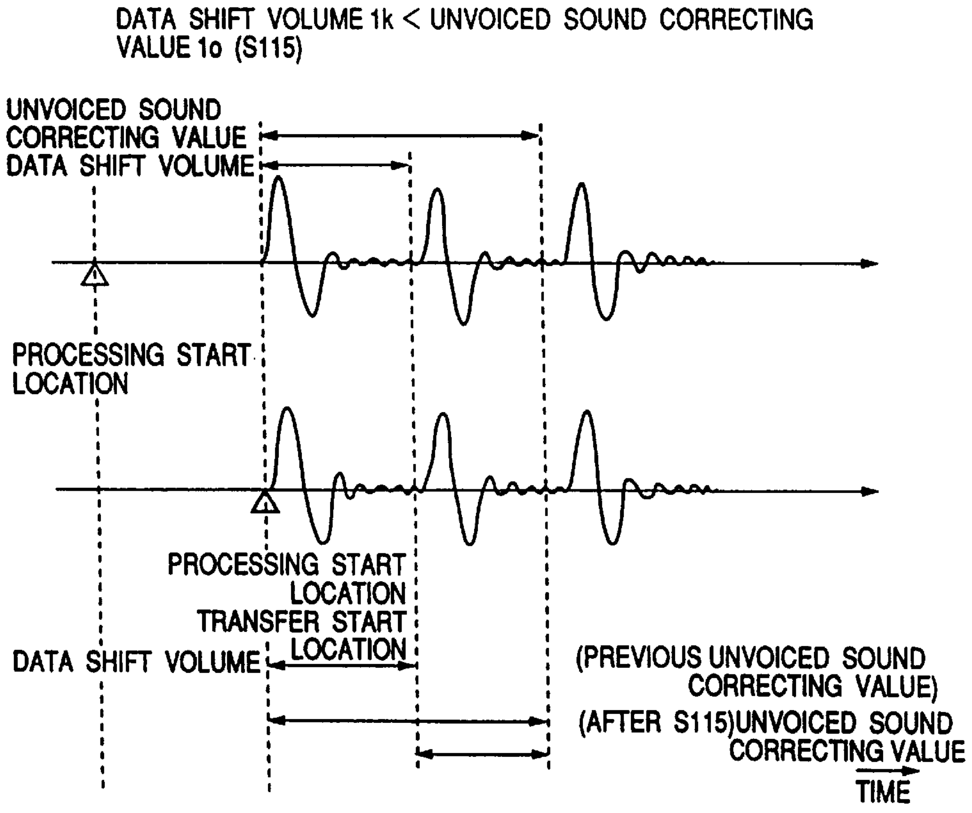
FIG. 9 is a waveform chart illustrating the processing which is performed in a step S115 shown in FIG. 5.
Figure 10:
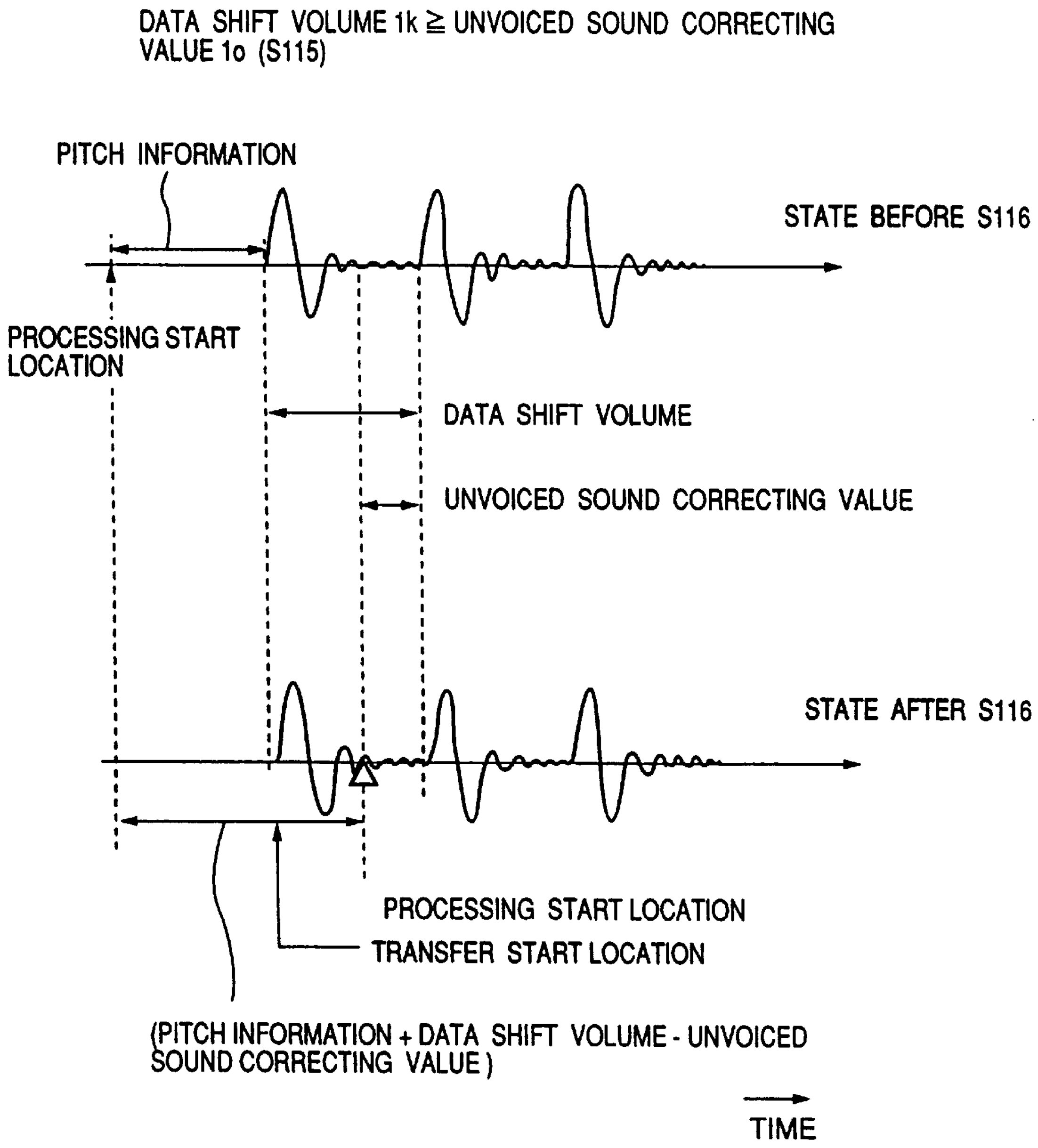
FIG. 10 is a waveform chart illustrating the processing which is performed in a step S116 shown in FIG. 5.

In the step S115, the value of (processing start location 1*i*) is set to {(processing start location 1*i*)+(pitch information 1*j*)}. The value of (unvoiced sound correcting value 1*o*) is set to {(unvoiced sound correcting value 1*o*)−(data shift volume 1*k*)}. The processing proceeds to a step S117. In the step S116, the value of (processing start location 1*i*) is set to {(processing start location 1*i*)+(pitch information 1*j*)+(data shift volume 1*k*)−(unvoiced sound correcting value 1*o*)}. The value of (unvoiced sound correcting value 1*o*) is then set to zero. FIGS. 9 and 10 are the waveform charts exemplifying the processing which is performed in the steps S115 and S116. In the step S117, the value of (transfer start location 1*n*) is set to {(transfer start location 1*n*)+(pitch information 1*j*)}. In the next step S118, the speech velocity converted sound signal 1*e* is output to the output sound signal frame buffer 8. The speech velocity converted sound signal 1*e* is the data which ranges from the address (transfer start location 1*n*) to the address (processing start location 1*i*) in the sound signal storage memory 1. As shown in FIG. 9, when the value of (unvoiced sound correcting value 1*o*) is larger than the (data shift volume 1*k*), (processing start location 1*i*)=(transfer start location 1*n*). Accordingly, a data transfer volume is zero in the step S118.

In a next step S119, the value of (frame buffer pointer 1*p*) is set to {(frame buffer pointer 1*p*)+(processing start location 1*i*)−(transfer start location 1*n*)}. The processing proceeds to the step S102.

The above processing is carried out, whereby the unvoiced sound itself is output as it is. The voiced sound is windowed and the speech velocity conversion is performed by operating an addition. With the time length of R times (R<1) that of the original sound signal, the speech velocity converted sound signal can be sequentially reproduced without deforming the waveform of the unvoiced sound part in the sound signal. When the unvoiced sound continues long, the processing is performed in the steps S115 and S116 of FIG. 5 so as to avoid an incapability of obtaining a desired reproducing velocity due to an increase of the part which is not to be windowed. In the steps S115 and S116, the address of the processing start location is controlled so as to reduce the data transfer volume of the actual voiced sound. Accordingly, when a user sets a desired reproducing velocity, according to the present invention, even if the sound signal generates many unvoiced sounds, it is possible to obtain the reproducing velocity which approximates to a desired reproducing velocity.

Next, a second and a third embodiments of the present invention will be described. Block portions having the same or corresponding function in the first embodiment have the same reference numbers. The detailed description is omitted.

(2$^{nd}$ Embodiment)

Figure 11:
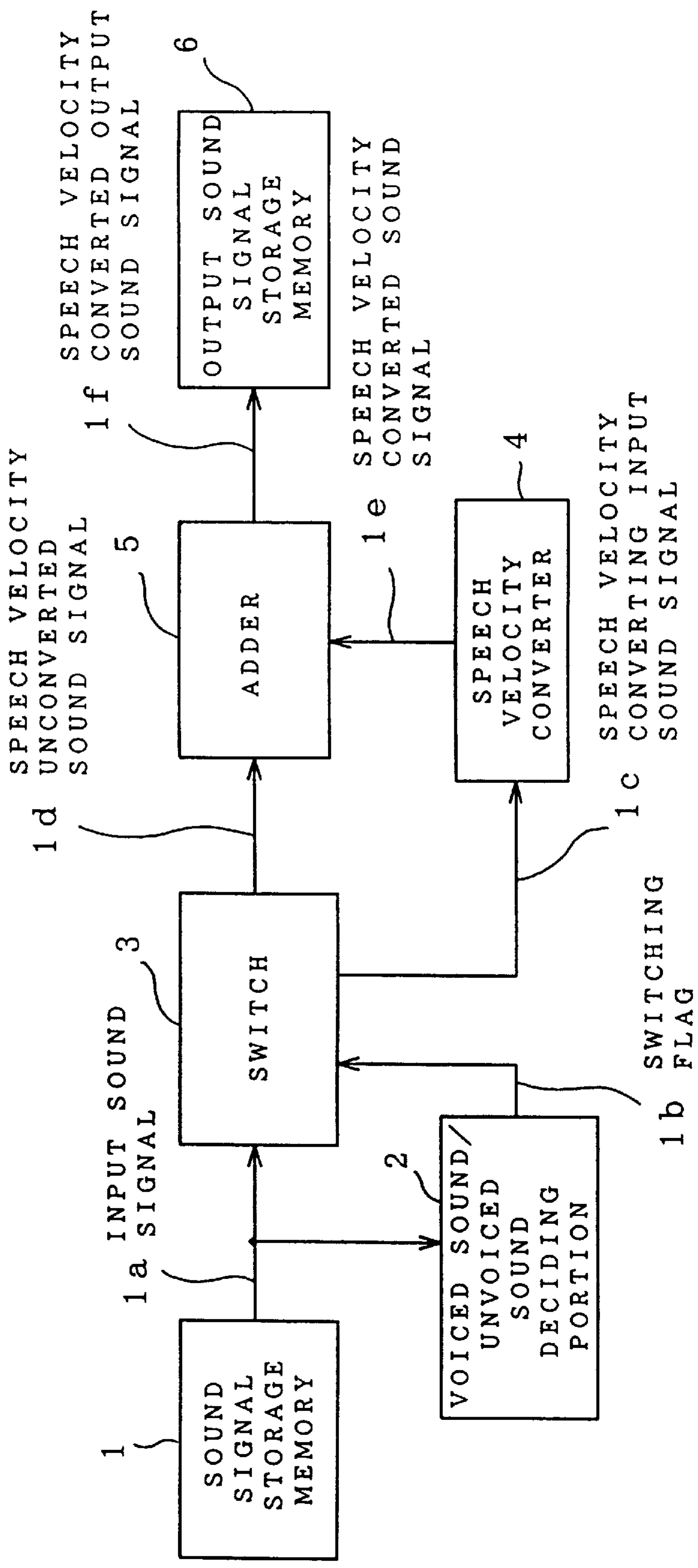
FIG. 11 is a block diagram showing the construction of the reproducing velocity converting apparatus according to a second embodiment of the present invention.

FIG. 11 is a block diagram showing the reproducing velocity converting apparatus according to the second embodiment of the present invention.

Referring now to FIG. 11, numeral 1 denotes the sound signal storage memory which records and holds the sound signal. Numeral 2 denotes the voiced sound/unvoiced sound deciding portion which decides whether the sound signal is a voiced sound or an unvoiced sound in the arbitrary section. Numeral 3 denotes the switch for switching an output destination at which the sound signal is to be output. Numeral 4 denotes the speech velocity converter which can change the time length alone without changing the interval of the sound signal. Numeral 5 denotes an adder which can add a plurality of signals to one another. Numeral 6 denotes the output sound signal storage memory which can record the processed sound signal.

In addition, numeral 1*a* denotes the input sound signal.

Numeral 1*b* denotes the switching flag. Numeral 1*c* denotes the speech velocity converting input sound signal. Numeral 1*d* denotes a speech velocity unconverted sound signal. Numeral 1*e* denotes the speech velocity converted sound signal. Numeral 1*f* denotes a speech velocity converted output sound signal.

Hereinafter, the above constructed reproducing velocity converting apparatus and the operation thereof will be described in detail.

In the first place, the input sound signal 1*a* is transmitted from the sound signal storage memory 1 to the voiced sound/unvoiced sound deciding portion 2 and the switch 3. In the voiced sound/unvoiced sound deciding portion 2, it is determined whether the input sound signal 1*a* is a voiced sound or an unvoiced sound. The decision result is transmitted to the switch 3 as the switching flag 1*b*. In the switch 3, it is determined whether the input sound signal 1*a* is a voiced sound or an unvoiced sound in accordance with the switching flag 1*b*. When the input sound signal 1*a* is the voiced sound, the input sound signal 1*a* is transmitted to the speech velocity converter 4 as the speech velocity converting input sound signal 1*c*. Furthermore, unvoiced sound data is transmitted to the adder 5 as the speech velocity unconverted sound signal 1*d*. At this time, the input sound signal 1*a* is equivalent to the speech velocity converting input sound signal 1*c*. When the input sound signal 1*a* is the unvoiced sound, the input sound signal 1*a* is transmitted to the adder 5 as the speech velocity unconverted sound signal 1*d*. The unvoiced sound data is transmitted to the speech velocity converter 4 as the speech velocity converting input sound signal 1*c*. At this time, the input sound signal 1*a* is equivalent to the speech velocity unconverted sound signal 1*d*.

In the speech velocity converter 4, the speech velocity converting input sound signal 1*c* is speech-velocity-converted so that the speech velocity converted sound signal 1*e* is calculated. In the adder 5, the speech velocity unconverted sound signal 1*d* is added to the speech velocity converted sound signal 1*e*. The resultant speech velocity converted output sound signal if is output to the output sound signal storage memory 6. In the output sound signal storage memory 6, the speech velocity converted output sound signal 1*f* is recorded.

The above processing is performed whereby it is possible to obtain the speech velocity converted sound signal which does not deform the waveform of the unvoiced sound part of the sound signal.

(3$^{rd}$ Embodiment)

Figure 12:
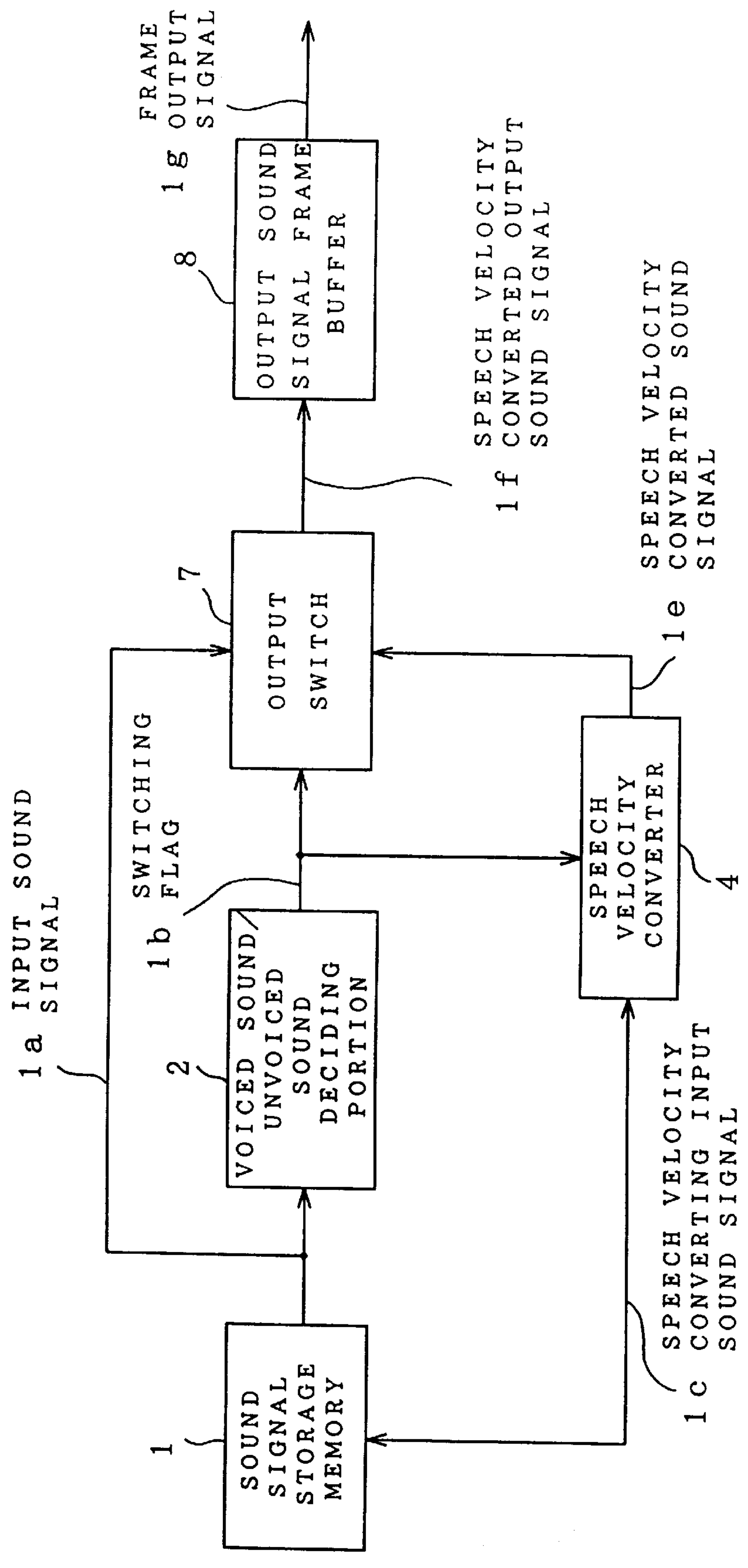
FIG. 12 is a block diagram showing the construction of the reproducing velocity converting apparatus according to a third embodiment of the present invention.
Figure 13:
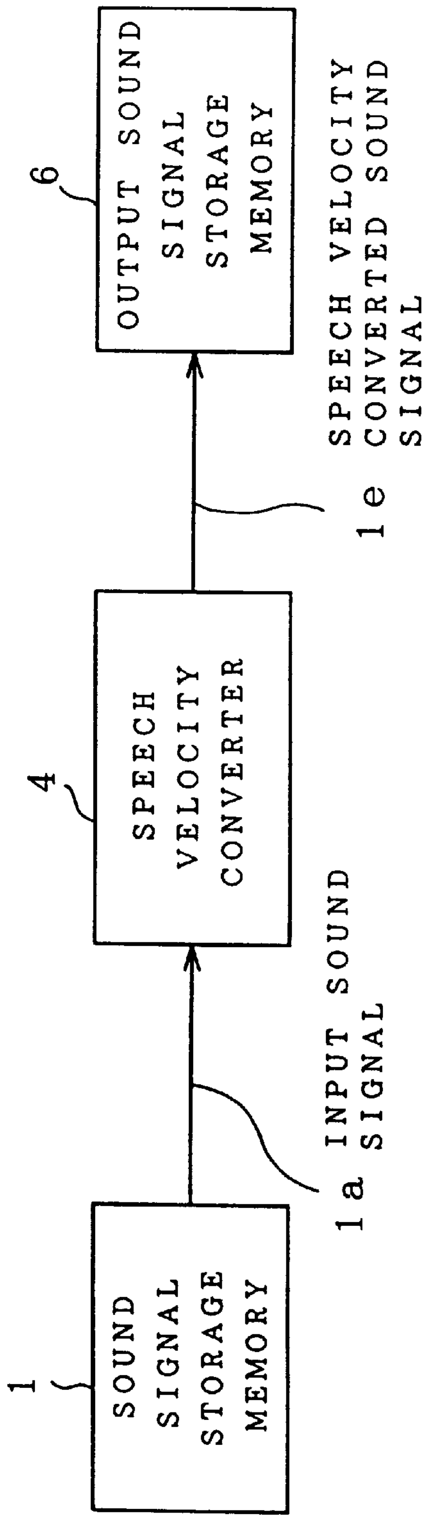
FIG. 13 PRIOR ART
FIG. 13 is a block diagram showing the construction of the prior-art reproducing velocity converting apparatus.

FIG. 12 is a block diagram showing the reproducing velocity converting apparatus according to a third embodiment of the present invention.

Referring now to FIG. 12, numeral 1 denotes the sound signal storage memory which records and holds the sound signal. Numeral 2 denotes the voiced sound/unvoiced sound deciding portion which decides whether the sound signal is a voiced sound or an unvoiced sound in the arbitrary section. Numeral 4 denotes the speech velocity converter which can change the time length alone without changing the interval of the sound signal. Numeral 7 denotes an output switch which outputs arbitrary one of a plurality of input signals by an external control signal. Numeral 8 denotes the output sound signal frame buffer which can output the signal having the frame length determined at the constant timing.

In addition, numeral 1*a* denotes the input sound signal. Numeral 1*b* denotes the switching flag. Numeral 1*c* denotes the speech velocity converting input sound signal. Numeral 1*e* denotes the speech velocity converted sound signal. Numeral 1*f* denotes the speech velocity converted output sound signal. Numeral 1*g* denotes the frame output signal.

The above constructed reproducing velocity converting apparatus and the operation thereof will be described below in detail.

In the first place, the input sound signal 1*a* is transmitted from the sound signal storage memory 1 to the voiced sound/unvoiced sound deciding portion 2. In the voiced sound/unvoiced sound deciding portion 2, it is determined whether the input sound signal 1*a* is a voiced sound or an unvoiced sound. The decision result is transmitted to the speech velocity converter 4 and the output switch 7 as the switching flag 1*b*. In the speech velocity converter 4, only when the switching flag 1*b* is indicative of the voiced sound, the speech velocity converting input sound signal 1*c* to be transmitted from the sound signal storage memory 1 is speech-velocity-converted. The speech velocity converted sound signal 1*e* is calculated. When the switching flag 1*b* is indicative of the unvoiced sound, the speech velocity converting input sound signal 1*c* is not speech-velocity-converted in the speech velocity converter 4. In the output switch 7, when the switching flag 1*b* is indicative of the voiced sound, the speech velocity converted sound signal 1*e* is output to the output sound signal frame buffer 8 as the speech velocity converted output sound signal 1*f*. When the switching flag 1*b* is indicative of the unvoiced sound, the input sound signal 1*a* is output to the output sound signal frame buffer 8 as the speech velocity converted output sound signal 1*f*.

The above processing is repeated until the data volume in the output sound signal frame buffer 8 reaches a predetermined constant value. When the data volume in the output sound signal frame buffer 8 reaches a predetermined constant value, the above processing is temporarily stopped. The output sound signal frame buffer 8 outputs the frame output signal 1*g* outward at a predetermined arbitrary timing. After the frame output signal 1*g* is output, the temporarily stopped processing is restarted.

The above processing is performed whereby it is possible to sequentially reproduce the speech velocity converted sound signal which does not deform the waveform of the unvoiced sound part of the sound signal.

As described above, according to the first embodiment, the apparatus is provided with the voiced sound/unvoiced sound deciding portion 2, the speech velocity converter 4 and the output sound signal frame buffer 8. Accordingly, the speech velocity conversion can be performed without changing the interval of the original sound signal and without deforming the waveform of the unvoiced sound part. In the first embodiment, an output time of the voiced sound is controlled in accordance with the time length of the unvoiced sound. Accordingly, the speech velocity conversion can be performed which is operated in a frame processing with substantial fidelity to a set compressibility without changing the sound of the original sound signal and without deforming the waveform of the unvoiced sound part.

Furthermore, according to the second embodiment, the input sound signal 1*a* and the speech velocity converted sound signal 1*e* which is output from the speech velocity converter 4 are switched to each other by the switch 7 in accordance with the result of the voiced sound/unvoiced sound deciding portion 2. The switched signal is then output to the output sound signal frame buffer 8. Thereby, the speech velocity conversion can be performed which is operated in the frame processing without changing the interval of the original sound signal and without deforming the waveform of the unvoiced sound part.

Furthermore, according to the third embodiment, the unvoiced sound part of the sound signal is not speech-velocity-converted in the voiced sound/unvoiced sound deciding portion 2 and the switch 3. Accordingly, the speech velocity conversion can be performed without changing the interval of the original sound signal and without deforming the waveform of the unvoiced sound part.

As described above, according to the present invention, the voiced sound/unvoiced sound decision result is used so as to compress the voiced sound alone and to output the unvoiced sound as it is. Accordingly, the speech velocity conversion can be carried out without deforming the waveform of the unvoiced sound part. In addition, the voiced sound/unvoiced sound decision result is used so as to control the address of the sound signal storage memory in such a manner that an output time length of the voiced sound is controlled in accordance with the time length of the unvoiced sound. Accordingly, the speech velocity conversion can be performed which is operated in the frame processing with substantial fidelity to the set compressibility and does not need the switch without changing the sound of the original sound signal and without deforming the waveform of the unvoiced sound part. A clear velocity converted sound can be obtained.

Moreover, according to the present invention, the voiced sound/unvoiced sound decision result and the switch are used so as to control whether the original sound signal is output as it is or the speech velocity converted sound signal is output. Accordingly, the speech velocity conversion can be performed without changing the interval of the original sound signal and deforming the waveform of the unvoiced sound part. The clear velocity converted sound can be obtained.

Furthermore, according to the present invention, the voiced sound/unvoiced sound decision result and the switch are used so as to control whether the original sound signal or the speech velocity converted sound signal is output. Accordingly, the speech velocity conversion can be performed which is operated in the frame processing without changing the interval of the original sound signal and deforming the waveform of the unvoiced sound part. The clear velocity converted sound can be obtained.

Possibility of Industrial Utilization

As described above, according to the present invention, a speech velocity conversion can be performed without changing an interval of an original sound signal and deforming a waveform of an unvoiced sound part. A clear velocity converted sound can be obtained. Accordingly, when the sound signal is read from recording media, a reproducing velocity is higher than the velocity during a record of the sound signal. The present invention is applicable to an apparatus which operates a so-called high-speed listening. The present invention can be suitably applied to an optical disk, an optical magnetic disk, a sound reproduction from a VTR, a dictation apparatus, an answering telephone and the like.

I claim:

1. A reproducing velocity converting apparatus comprising:

data recording means (1) for recording and holding a sound signal in the form of a digital signal;

voiced sound/unvoiced sound deciding means (2) for deciding whether said sound signal is a voiced sound or an unvoiced sound in an arbitrary section of said sound signal which is held in said data recording means;

speech velocity converting means (4) for a sound signal being read from said data recording means, said speech converting means outputting a sound as it is in a section which is decided to be an unvoiced sound part by said voiced sound/unvoiced sound deciding means, said speech velocity converting means outputting, by changing only a time length of the sound in the section which is decided to be a voiced sound part by said voiced sound/unvoiced sound deciding means, wherein said speech velocity converting means has means for controlling a reading of the sound signal from said data recording means, said controlling means uses a decision result of said voiced sound/unvoiced sound deciding means so as to control a voiced sound part reading address in accordance with the time length of the unvoiced sound part so that an output signal may provide a value which approximates to a desired reproducing velocity; and data output means (8) which can output a signal having a determined frame length of the output signal from said speech velocity converting means.

2. A reproducing velocity converting apparatus comprising:

data recording means (1) for recording and holding a sound signal in the form of a digital signal;

voiced sound/unvoiced sound deciding means (2) for deciding whether said sound signal is a voiced sound or an unvoiced sound in an arbitrary section of said sound signal which is held in said data recording means;

data switching means (3) which can switch an output destination of the sound signal to be transmitted from said data recording means in accordance with the decision result from said voiced sound/unvoiced sound deciding means;

speech velocity converting means (4) for a sound signal being read from said data recording means, said speech velocity converting means outputting a sound as it is in a section which is decided to be an unvoiced sound part by said voiced sound/unvoiced sound deciding means, said speech velocity converting means outputting, by changing a time length of the sound in the section which is decided to be a voiced sound part by said voiced sound/unvoiced sound deciding means, wherein said speech velocity converting means has means for controlling a reading of the sound signal from said data recording means, said controlling means uses a decision result of said voiced sound/unvoiced sound deciding means so as to control a voiced sound part reading address in accordance with the time length of the unvoiced sound part so that an output signal may provide a value which approximates to a desired reproducing velocity;

data adding means (5) which can add the output signal from said speech velocity converting means to the output signal from data switching means; and output data recording means (6) which can record the output signal from said data adding means, the processed sound signal.

3. A reproducing velocity converting apparatus comprising:

data recording means (1) for recording and holding a sound signal in the form of a digital signal;

voiced sound/unvoiced sound deciding means (2) for deciding whether said sound signal is a voiced sound or an unvoiced sound in an arbitrary section of said sound signal which is held in said data recording means;

speech velocity converting means (4) for a sound signal being read from said data recording means, said speech velocity converting means outputting a sound as it is in a section which is decided to be an unvoiced sound part by said voiced sound/unvoiced sound deciding means, said speech velocity converting means outputting, by changing a time length of the sound in the section which is decided to be a voiced sound part by said voiced sound/unvoiced sound deciding means, wherein said speech velocity converting means has means for controlling a reading of the sound signal from said data recording means, said controlling means uses a decision result of said voiced sound/unvoiced sound deciding means so as to control a voiced sound part reading address in accordance with the time length of the unvoiced sound part so that an output signal may provide a value which approximates to a desired reproducing velocity;

signal controlling means (7) for receiving the output signals from said data recording means and speech velocity converting means and for outputting one of them in accordance with the decision result of said voiced sound/unvoiced sound deciding means; and data output means (8) which can output a signal having a determined frame length of the output signal from said signal controlling means.

* * * * *